Nov. 22, 1966  R. KLOTZ  3,286,326
METHOD OF ASSEMBLING A FORKED SPRING
WITHIN A BOW-SHAPED CONTACT
Filed Nov. 17, 1964  4 Sheets-Sheet 2

3,286,326
METHOD OF ASSEMBLING A FORKED SPRING WITHIN A BOW-SHAPED CONTACT
Roland Klotz, Steinheim (Murr), Germany, assignor to International Standard Electric Corporation, New York, N.Y., a corporation of Delaware
Filed Nov. 17, 1964, Ser. No. 411,758
Claims priority, application Germany, Nov. 27, 1963, St 21,368
1 Claim. (Cl. 29—155.55)

The invention relates to elastic plug-in contacts and to a method for manufacturing plug-in contacts which consist of a bow-shaped contact spring within which a bow-shaped tension spring has been inserted.

With plug-in contacts of the type referred in this application, the contact springs engage with their bow ends the ends of the inserted tension springs and thereby provide conductive connections with contact knife blades inserted into the bow openings. Furthermore, slotted recesses are provided at the bow ends and bent inside for fixing the tension springs within the contact springs, which recesses engage the bow ends of the tension springs from the inside. Finally, in each such plug-in contact, the vertex of the bow of the contact spring has a recess, which serves to accommodate a stud provided at the vertex of the tension spring, safeguarding the latter one completely against shifting.

Difficulties in manufacturing such contacts, hitherto made by an expensive and frequently inexact manual assembly, primarily occurred when the tension spring was inserted into the contact spring. For economic production it is necessary that the work processes required for final shaping of the contact spring be completed before final assembly of the tension spring. After the shaping of the contact spring has been completed, the insertion of the tension spring requires a partial bending of the spring bow in order to enable a form-locking engagement of the tension spring into the recesses of the contact spring.

It is an object of the invention, to provide a method to manufacture contact springs of the kind mentioned, considering the before described view points and avoiding the difficulties hitherto known. Particularly mechanizing of the assembly should also provide for more economical production and increased precision in the manufacturing steps.

The proposed solution of this problem therefore refers to a method to produce elastic plug-in contacts consisting of a bow-shaped contact spring and a therein inserted, also bow-shaped tension spring, whereby the bow ends of the contact spring engage the bow ends of the tension spring in the bow plane as well as perpendicular to said plane and whereby the bow vertexes of both springs are indented perpendicular to the bow's plane. The method according to the invention is essentially characterized in this, that the bow ends of the contact spring are bent towards the bow aperture, prior to assembly with the tension spring, to such a distance that the tension spring can be inserted traversely to the bow's plane. The tension spring is then shifted in an oblique direction towards the bow's plane of the contact spring for mutual engagement of the indented bow vertexes of both springs and then swivelled into said contact spring, and finally the bow ends of the contact spring are brought into their final shape by means of a pressure piece engaging the spring opening. This method enables a nearly complete prefabrication of both springs and avoids the otherwise required rebending upward of the contact spring in order to insert the tension spring.

It is an object of the invention to provide an apparatus to perform the proposed method. The apparatus essentially consists of an advancing shift mechanism, arranged at an oblique angle to the bow's plane of the contact spring for the tension spring and two dies arranged shiftable towards each other and perpendicular to the bow's plane, one die serving to swivel the tension spring into the contact spring, whereas the other die engages, in its operative position, into the bow aperture and thus with the wedge-shaped lateral surface fixing the bow ends as a pressure piece for bending the bow ends of the contact spring together.

Further advantages and features of the invention may be gathered from the following description of an example, referring to the accompanying drawings, wherein.

Figure 1:
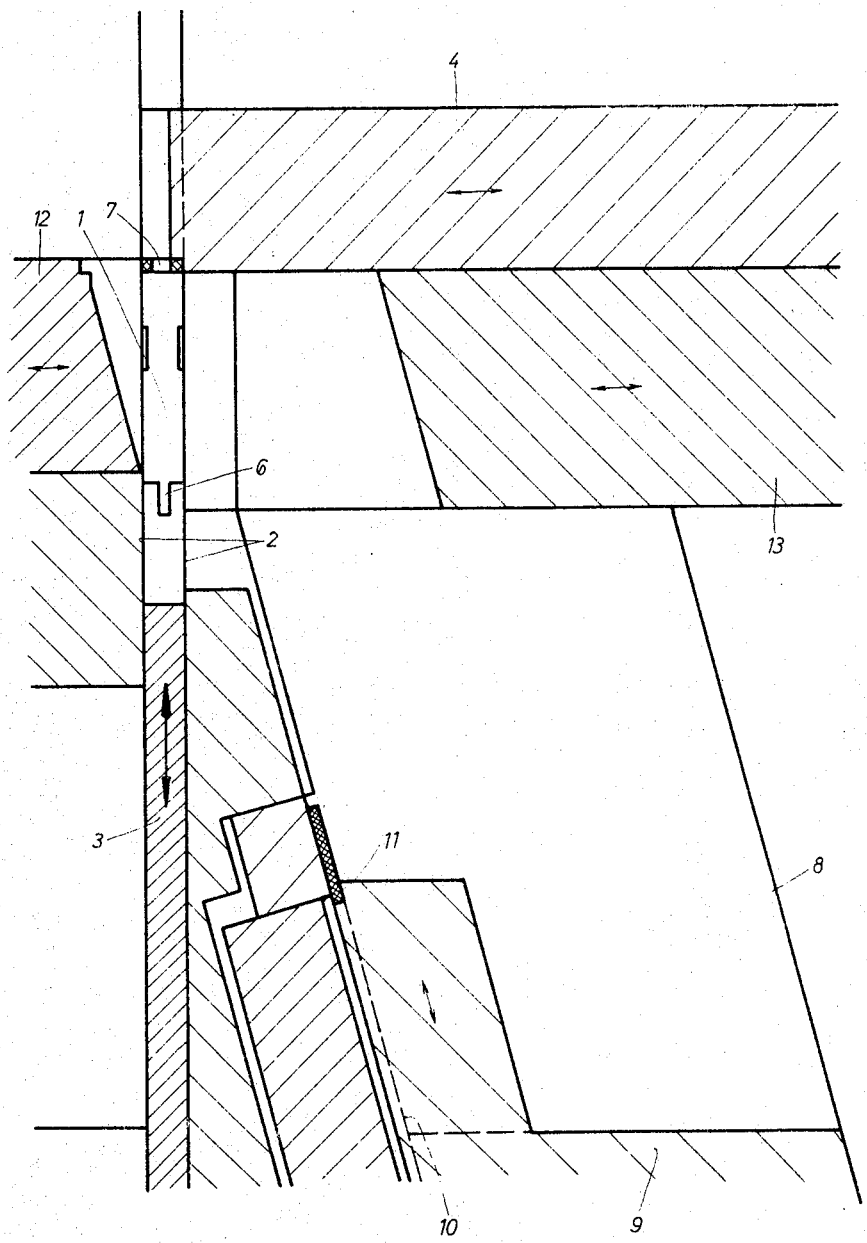
FIG. 1 shows a sectional view of a preferred embodiment of apparatus to perform the method according to the invention for manufacturing the contact spring inserted into the apparatus transverse to the bow's plane.
Figure 1A:
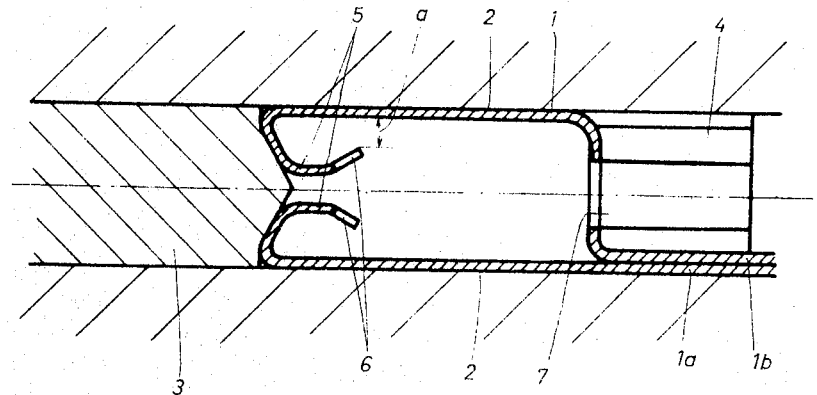
FIG. 1a shows a section in the bow's plane of the contact spring in the same operating condition.

FIGS. 1 and 1a show the contact spring 1 in a guide 2 of the device and advanced towards a stop 4 shiftable in the perpendicular direction and with the aid of a slide 3. The contact spring 1 consists of two bow sections which are fixed to each other and their ends, shaped as soldering lugs 1a and 1b. The contact spring has nearly its final shape, particularly the bow ends 5 are already bent towards the bow's aperture.

The external bow ends, provided with slotted recesses, or slots, 6 for later accommodation of the tension spring, still deviate from their their final shape and have a distance $a$ from the bow limbs, in order to permit insertion of the tension spring. Furthermore a recess, or aperture, 7 is provided in the bow vertex, or bight, of contact spring 1 to accommodate a suitable stud at the bow vertex (or bight) of said tension spring.

In a slide 8, askew towards the bow's plane of the contact spring 1, an advance slide 9 is provided for the tension spring 11 inserted into a suitable receiving device 10. The advancing slide 9 and a top die 12, shiftable perpendicular to the bow's plane of the contact spring 1, and a corresponding bottom die 13 are shown in FIG. 1 in their initial position.

Figure 2:
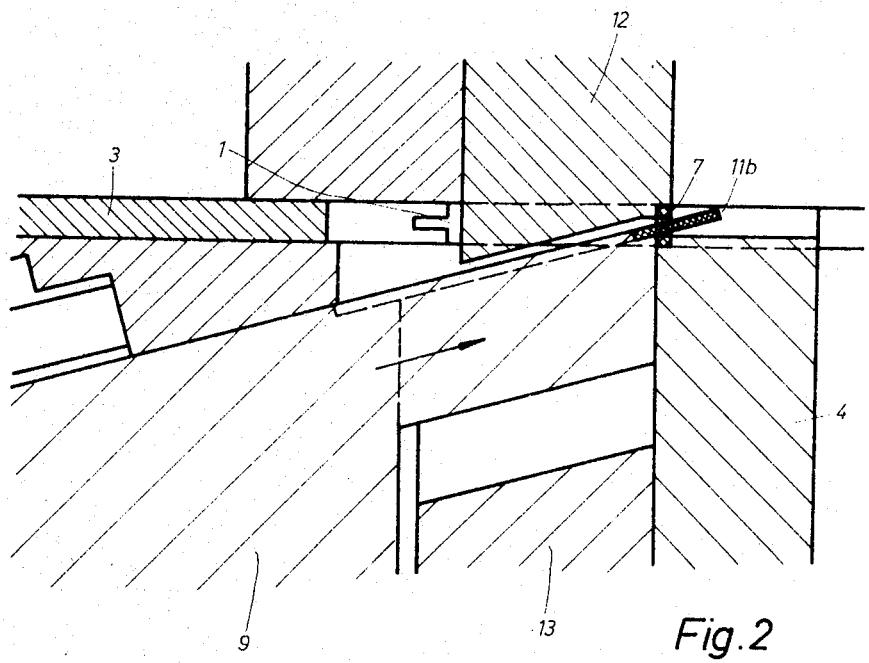
FIG. 2 shows a section perpendicular to said plane with the top die lowered into the bow's aperture and the inserted tension spring.

In FIG. 2 the top die 12 is lowered and engages with its bottom side into the bow aperture of the contact spring 1. The advancing slide 9 with the inserted tension spring 11 is placed in correct position whereby a stud 11b, provided at the bow vertex of the tension spring engages into the recess or aperture 7 of the contact spring.

Figure 3:
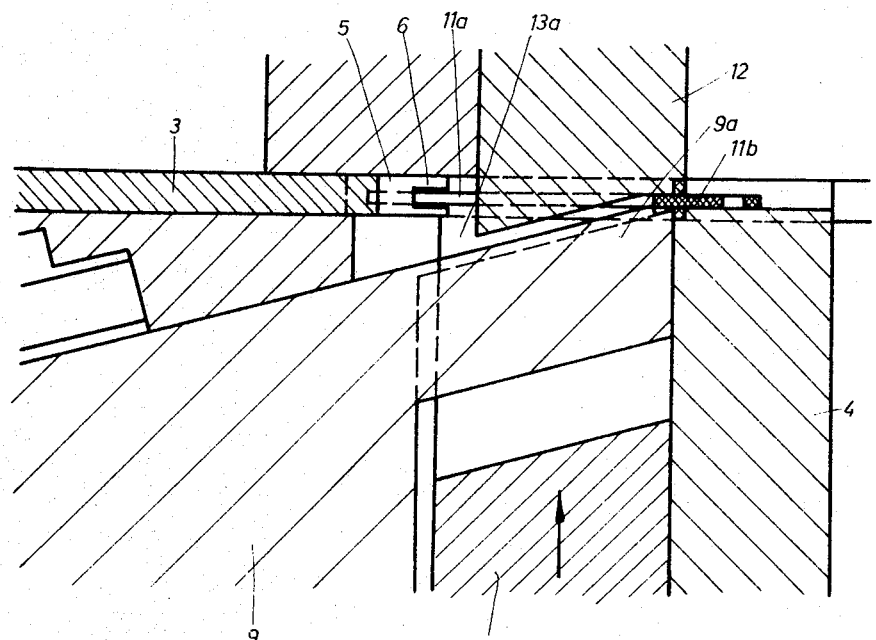
FIG. 3 shows a section according to FIG. 2 with swivelled-in tension spring.
Figure 3A:
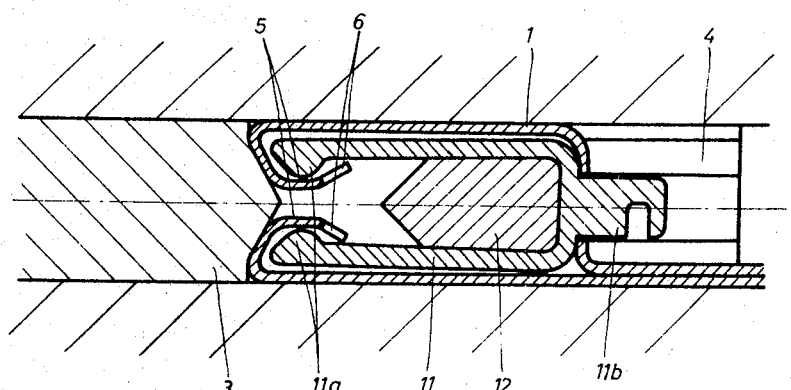
FIG. 3a shows a section in the bow's plane in operative condition according to FIG. 3.

In the operative position according to FIG. 3 and FIG. 3a, respectively, the bottom die 13, engaging the top section 9a of the feeder 9, which is fork-shaped on either side, has risen to its top position. By this means the tension spring 11 is lifted from its recess 10 in the feeder 9 and swivelled from the bottom into the bow's plane of the contact spring. The bow ends 11a of the tension spring are now located within the bend bow ends 5 of the contact spring and are in line with the recesses 6 provided in the external bow ends. The bottom side of the top die 12 serves to locate the center when the tension spring is swivelled into and placed in its final position in the bow aperture of the tension spring.

Figure 4:
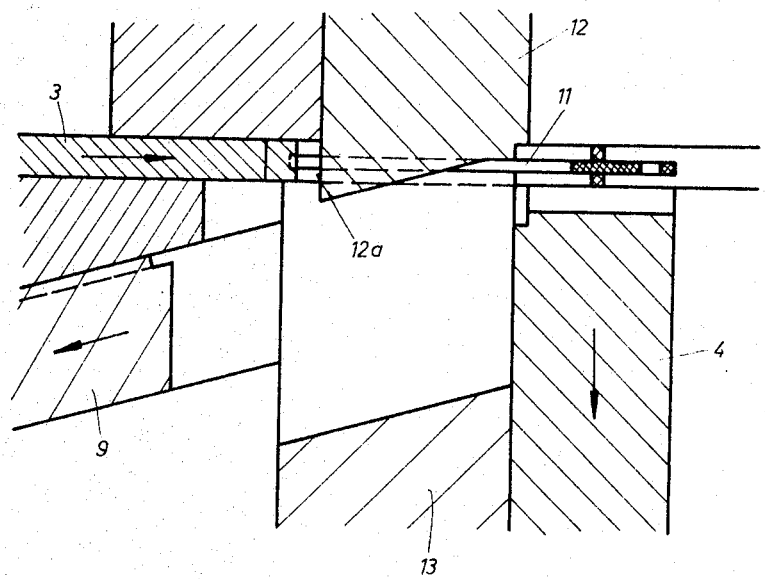
FIG. 4 and 4a show sections perpendicular to the bow's plane and in the bow's plane, respectively after final shaping of the contact spring.
Figure 4A:
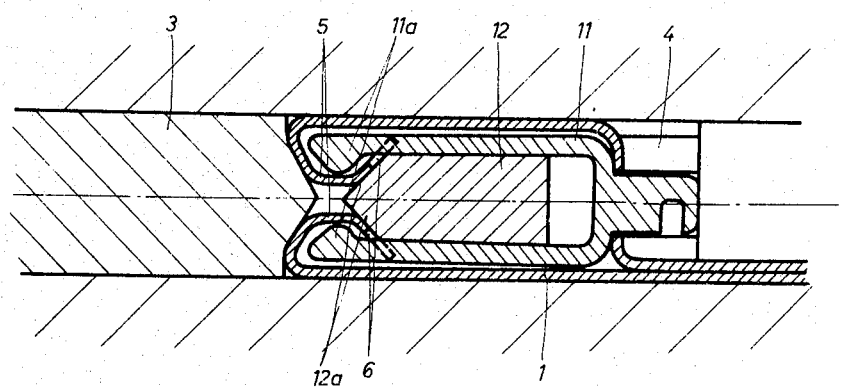

In the operative position shown in FIG. 4 and FIG. 1a, respectively, the feeder slide 3 has pressed the contact spring with inserted tension spring towards the wedge-shaped lateral surface 12a of the top die 12, whereby the terminating sections 5 of the contact spring are bent into their final shape. The bow ends 11a of the tension spring are now in the recesses, or slots, 6 of the contact spring and are secured against shifting in a direction perpendicular to the bow's plane. In preparing the just described work process the slides 4 and 9 were returned into their bottom resting positions. Thereupon the dies 12 and 13 are returned to their resting positions and the finished contact can be thrown out of the apparatus by a further shifting towards right.

While the principles of the invention have been described above in connection with specific apparatus and applications, it is to be understood that this description is made only by way of example and not as a limitation on the scope of the invention.

What is claimed is:

A method for manufacturing an elastic plug-in contact, including an electrically conductive bow-shaped contact spring having slots on inwardly directed bow-shaped ends, and an aperture located in the bight of the spring on an axis passing between the inturned ends and bisecting said bight and including a planar bow-shaped tension spring having an integral stud located intermediate its ends and extending in a direction opposite to said last mentioned ends, and wherein the tension spring is nested within the contact spring with its stud passing through the contact spring aperture and its end passing through said slots and engaging the outer sides of the inturned ends whereby said contact and tension springs are located together comprising:

firmly supporting said contact spring;
inserting said tension spring into the contact spring from one side of said contact spring to engage said aperture in the contact spring with said stud;
rotating the tension spring into a plane through the contact spring to cause engagement between said slots in the contact spring and ends of the tension spring;
inserting a pressure piece within said tension spring;
forcing said pressure piece to engage the contact spring bow-shaped ends to permanently deform said last mentioned ends simultaneously to firmly lock out said tension spring and form a permanent plug-in contact; and
removing said pressure piece.

References Cited by the Examiner

UNITED STATES PATENTS

| 2,105,884 | 1/1938 | Hanser et al. | 339—259 X |
| 2,149,196 | 2/1939 | Suprenant | 229—259 |
| 2,792,472 | 11/1954 | Koch | 339—259 X |
| 3,199,176 | 8/1965 | Frendiger et al. | 29—155.55 |
| 3,208,129 | 9/1965 | Talbot et al. | 29—155.55 |

JOHN F. CAMPBELL, *Primary Examiner.*

R. W. CHURCH, *Assistant Examiner.*